Nov. 22, 1955   J. S. PAGE   2,724,401
CONTROL FOR WATER HEATER
Filed Oct. 18, 1952   2 Sheets-Sheet 1
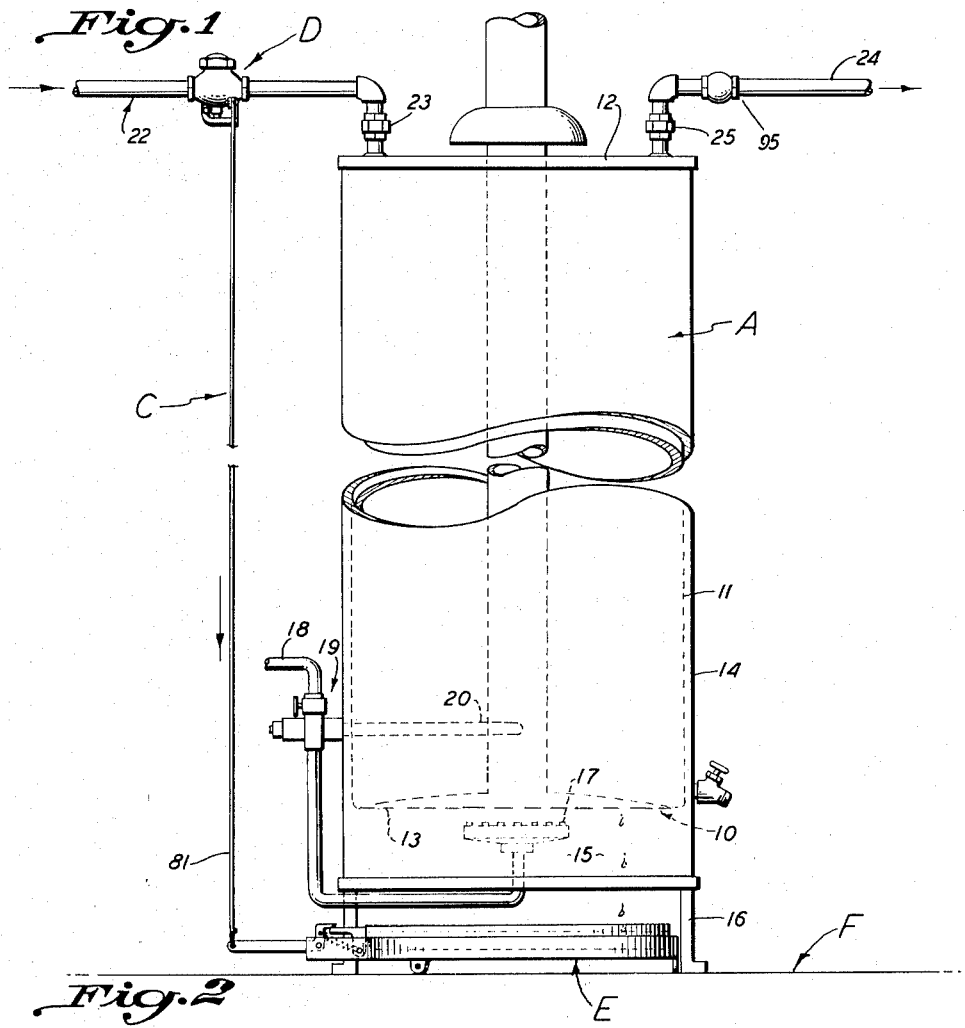
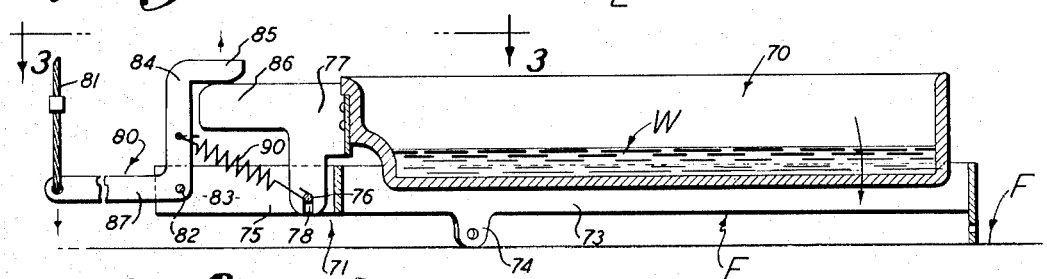
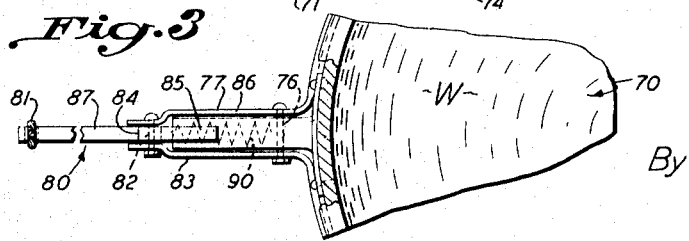
Inventor.
JOHN S. PAGE.
By
Attorney Nov. 22, 1955  J. S. PAGE  2,724,401
CONTROL FOR WATER HEATER
Filed Oct. 18, 1952  2 Sheets-Sheet 2
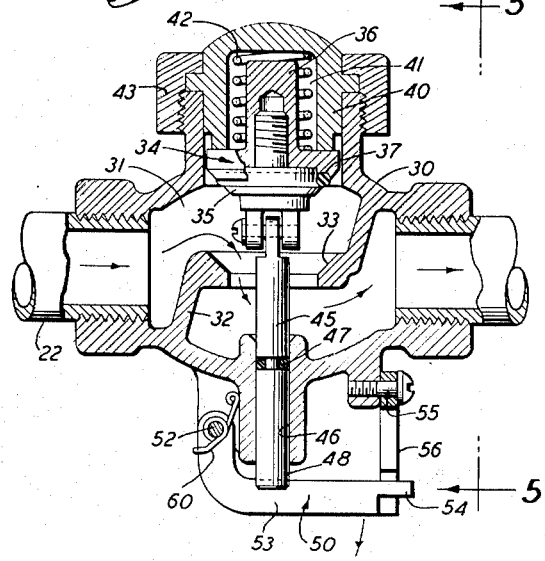
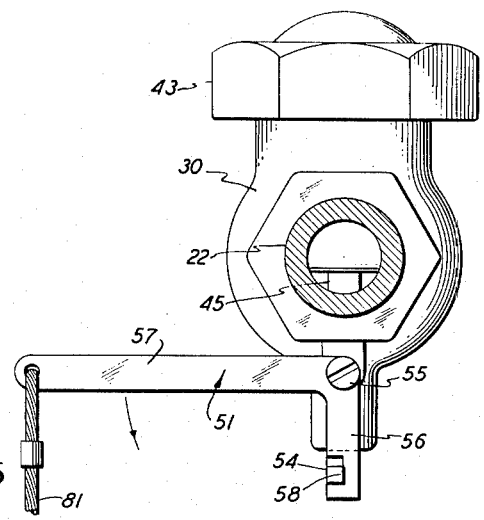
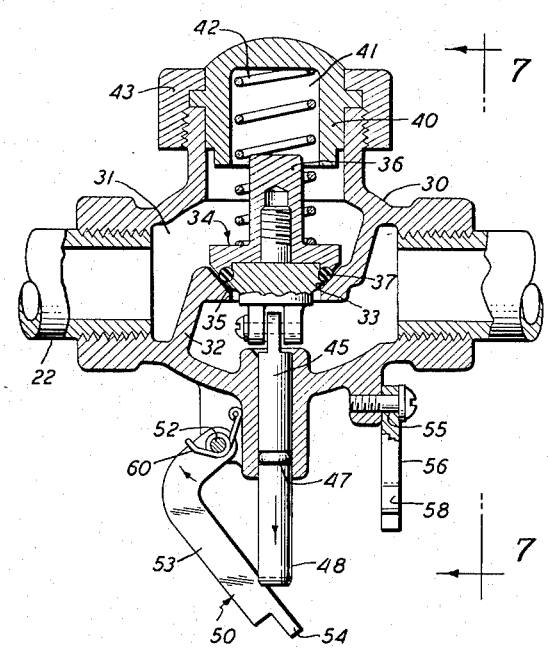
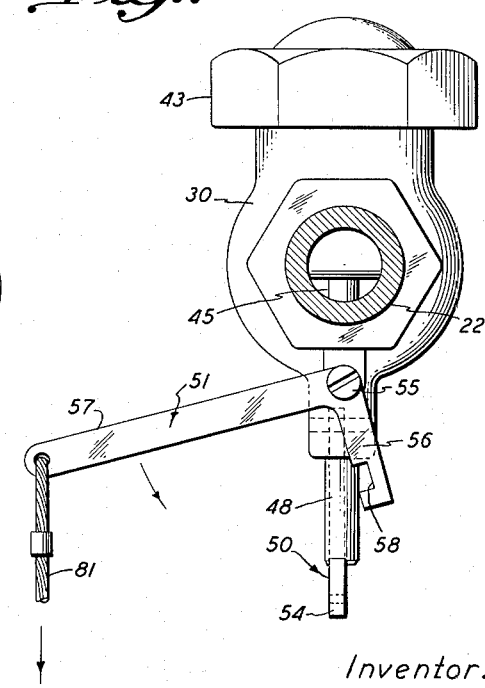
Inventor.
JOHN S. PAGE.
By
Attorney.

United States Patent Office 2,724,401
Patented Nov. 22, 1955

2,724,401

CONTROL FOR WATER HEATER

John S. Page, Long Beach, Calif., assignor, by mesne assignments, to Fluidal Valves, Inc., Long Beach, Calif., a corporation of California Application October 18, 1952, Serial No. 315,592

11 Claims. (Cl. 137—403)

This invention has to do with a control for a water heater, or the like, and it is a general object of the invention to provide a simple, practical, dependable control that operates in response to leakage of the water heater and which serves to stop or cut off the flow of water to the heater.

Water heaters are used for various purposes and in various situations and commonly employ gas as fuel. A great many water heaters are used in homes, and it is common to install them in limited or inaccessible places. Water heaters are generally equipped with satisfactory control means for the gas, and they operate satisfactorily until such time as leakage occurs. The ordinary water heater will fail, or develop a leak, without any warning whatsoever, and as a result of this, the water discharged by reason of leakage often damages parts of the building in which the heater is installed, floor coverings, and other objects or devices in the vicinity of the heater.

It is a general object of this invention to provide a control for or in connection with a water heater sensitive or responsive to leakage from the heater and such as to positively shut off or stop flow of water to the heater.

It is another object of this invention to provide a water heater control of the general character referred to which is such as to require or employ but a few simple, dependable working parts, all of which are such as to remain ready for operation over a long period of time, so that the control is constantly ready for service and is such as to operate dependably when the emergency or leakage of the heater occurs.

It is another object of this invention to provide a control of the general character referred to, characterized by a water control valve which is spring-loaded, and ready to operate whenever released, and which includes a latch mechanism which normally holds the valve in an open position, and which is simple in construction and dependable in operation.

It is another object of this invention to provide a control of the general character referred to, characterized by means responsive to water leaking from the water heater, which means is preferably gravity actuated, and such that it involves but one moving or working part.

It is a further object of this invention to provide a control of the general character referred to including a simple coupling means between the means responsive to water leaking from the heater and the valve controlling flow of water to the heater, which coupling means is such that it can be varied to meet various installations, making the control such that it can be readily applied to widely different heater installations.

In accordance with the present invention a typical or conventional water heater having a water supply line connected thereto, while a water delivery line extends therefrom, has a control valve in the supply line. The valve is preferably spring-loaded, that is, it preferably includes a spring normally under pressure or depression and adapted to close the valve and stop flow when the valve is actuated or released. The valve includes a latch mechanism normally releasably holding the movable element of the valve open against the pressure of the spring.

The control includes a means responsive to water that may leak from the heater and is preferably a gravity-actuated means. In a preferred form of the invention this means is characterized by an upwardly opening catch basin, preferably substantially of about the same size and shape as the lower end of the heater tank from which water is likely to drip when the heater leaks. The catch basin is supported by a mounting means establishing a pivotal axis for the basin at one side thereof, or adjacent the periphery of the basin.

The coupling means provided by the invention connects the means responsive to water leaking from the heater, and the valve provided for controlling flow of water to the heater. The coupling means may include a lever adapted to be operated by or from the basin as by means of a lug projecting from the basin and a member such as a line or rod subject to variation as to length extending from the lever to the latch mechanism of the control valve.

The various objects and features of my invention will be fully understood from the following detailed description of a typical, preferred form and application of the invention, throughout which description reference is made to the accompanying drawings, in which:

Fig. 1 is a view of a typical gas-fired water heater equipped with a control embodying the present invention. Fig. 2 is an enlarged, sectional view of a part of the control showing the parts of the control that occur at the bottom or lower end portion of the heater. Fig. 3 is a plan view, being a view taken as indicated by line 3—3 on Fig. 2. Fig. 4 is an enlarged, vertical, sectional view of the water control valve provided by the present invention. Fig. 5 is a view of the valve shown in Fig. 4, being a view taken as indicated by line 5—5 on Fig. 4. Fig. 6 is a view similar to Fig. 5, showing the valve released so that it is closed and thus stops flow of water therethrough, and Fig. 7 is a view of the structure shown in Fig. 6, being a view taken as indicated by line 7—7 on Fig. 6.

The control provided by the present invention, considered broadly, could be used in various situations. However, it is particularly practical for application to or incorporation in connection with a typical or conventional water heater, and for this reason it will be set forth in that connection.

In the drawings, a heater A is disclosed and, in accordance with conventional heater construction, it includes a tank 10 having a cylindrical, vertically disposed body 11, a top 12 and a bottom 13. A case 14 surrounds or carries the tank and has a skirt portion 15 depending therefrom and provided with legs 16, by which the heater may be mounted on a floor F, or the like. The skirt 15 of the case forms or defines a chamber beneath the tank and a suitable burner 17 is located in this chamber and is supplied with gas from a fuel line 18. A suitable control means 19 is provided to control the flow of gas to the burner 17 and includes a thermally responsive element 20 which may be arranged at or in connection with the tank 10, so that the means 19 acts to control the flow of gas to the burner in response to heat prevailing at or in the tank.

A water supply line 22 extends to the tank and connects with the upper end thereof, preferably through a suitable union connection 23, and a delivery line 24 extends from the tank, preferably from the upper end of the tank with which it is connected by a suitable union connection 25. The parts thus far described are those common to or ordinarily found in a gas-fired water heater and, in practice, they may be supplemented by other parts or features of equipment, as circumstances require.

The present invention provides, generally, a water control valve D to control the flow of water to the heater A, a means E responsive to water that may leak or drip from the tank 10, and coupling means C operatively connecting means E and valve D.

In the preferred application of the invention the water control valve D is applied to or connected in the water supply line 22 to be immediately ahead of the heater, and in the preferred embodiment of the invention it is a spring-loaded latch control valve. The valve D best illustrated on Sheet 2 of the drawings includes, generally, a body 30 adapted to be connected in the water supply line 22 and provided with a flow passage 31 adapted to handle the flow of water required for the heater. In the particular case illustrated, the body 30 has a partition 32 provided with an upwardly facing seat 33, through which normal flow of water occurs. A valve element 34 is carried in the body 30 above the seat 33 and is adapted to operate between an up and open position and a down or closed position. When the valve element 34 is open there is free flow through the seat 33, whereas when the element 34 is down or closed, there is no flow through the valve D.

In the particular construction illustrated, the valve element is of sectional construction, that is, it includes a seat section 35 and a head section 36, which sections are joined or threaded together and cooperate to carry a sealing ring 37 that engages and seals with the seat 33 when the valve element is down.

The body 30 is preferably formed with a head portion 40 provided with a chamber 41 that carries a compression spring 42. The spring 42 is normally under compression in chamber 41 and bears downwardly on the valve element 34 to normally yieldingly urge the valve element to downward position. In the particular case illustrated, the part 40 of the body 30 is a detachable part normally held in position by a threaded collar 43.

The valve D includes a stem 45 connected to the valve element 34 and depending therefrom to be slidably carried in a guideway 46 provided in body 30. The stem 45 carries a sealing ring 47 which prevents leakage of water from the body around the stem. The stem extends through the guideway 46 where it has an exposed end portion 48.

The latch means or mechanism of valve D is a releasable device normally serving to releasably hold the stem 45 in an up position so that the valve element 34 on the stem 45 is held away from the seat 33.

The particular latch mechanism illustrated in the drawings includes a trip lever 50 pivotally carried by the body 30 of the valve and engaged with the stem 45 and a control lever 51 pivotally carried by the body 30 and cooperatively engaged with the trip lever 50. In the preferred construction the trip lever 50 is pivotally mounted on the exterior of body 30 by means of a pivot pin 52, and it has an arm portion 53 which normally extends across the end of the projecting portion 48 of the stem 45. At the terminal end of the trip lever there is a finger 54.

The control lever 51 is preferably mounted on the exterior of body 30 by means of a pivotal mounting 55, and in the case illustrated it is in the form of a bell crank having an arm 56 cooperating with the trip lever 50, and an arm 57 engaged by the means C. In the mechanism illustrated, the levers 50 and 51 are carried by their pivotal mountings to operate in vertical planes at right angles to each other. In this case the arm 56 of lever 51 depends from the pivotal mounting 55, and it is provided in one side with a notch 58 that normally receives the finger 54 of the trip lever. The arm 57 extends horizontally and the parts are arranged and related so that when arm 57 is swung downwardly, as indicated by the arrow in Fig. 5, the arm 56 is swung away from the finger 54 so that lever 50 can swing downwardly, as indicated by the arrow in Fig. 4.

In accordance with the invention a spring 60 is preferably engaged with the trip lever 50 so that when finger 54 is released the trip lever is immediately swung away from the stem 54 to a position such as is shown in Fig. 6, freeing the valve element 34 so that it is moved down and to the closed position by the spring 42. Under normal conditions and before arm 57 is swung down, as just described, the pressure on the trip lever 50 due to spring 42 and spring 60, keeps the finger 54 tightly engaged with the arm 56 of lever 51.

The means E provided by the present invention and responsive to water that may leak from tank 10 is preferably a gravity-actuated means. In the particular form of the invention illustrated the means E is characterized by a simple, upwardly opening catch basin 70, and a mounting 71 pivotally supporting the catch basin. In the case illustrated, the catch basin is such as to substantially correspond in size and plan configuration with the lower end portion of the tank 10 from which water may drip when the tank leaks. The mounting means 71 for catch basin 70 is shown as including a base member or ring 73 adapted to be arranged beneath the tank and within the confines of the legs 16 that support the tank. The base ring 73 is shown as provided with supporting feet 74 and as having a projecting bracket 75 carrying a pivot pin 76. A part 77 of the basin projecting from the exterior or periphery thereof has a depending part with a notch 78 receiving the pivot pin 76. Through this construction the basin 70 is pivotally supported at its peripheral portion so that if water W accumulates in the basin it tends to turn or swing the basin downwardly, as indicated by the arrow in Fig. 2.

In the form of the invention illustrated in the drawings the coupling means C includes a lever 80 adapted to be operated by or from the basin 70, and a coupling member 81 connecting lever 80 and the arm 57 of valve D. In the particular case illustrated the lever 80 is a bell crank pivotally supported by pivot pin 82 carried by an extension 83 of part 75 that projects from the base ring 73. The bell crank has an arm 84 that projects upwardly and which has a horizontally projecting part 85 at its upper end. A lug 86, rigid with and projecting horizontally from the basin 70 at the portion of the basin that is pivotally mounted, engages under the part 85 of lever arm 84 to normally bear upwardly against part 85. The parts are arranged and proportioned so that when lug 86 is engaged under part 85 of arm 84 the basin 70 is in a normal unactuated or horizontal position, as shown in Fig. 2. The other arm 87 of the lever 80 extends horizontally, as clearly illustrated in Fig. 2 of the drawings.

The coupling member 81 may, in practice, be a simple rod or line connected to the outer end portion of arm 87 and to the outer end portion of arm 57. The member 81 is preferably established to be of such length as to extend tightly between the arms 87 and 57, and in the case illustrated it operates under tension.

The mechanism includes a spring 90 provided to normally yieldingly hold the lever 80 in the position illustrated in Fig. 2 of the drawings where part 85 overlies the lug 86 on the basin 70. In the particular case illustrated spring 90 is a helical tension spring having one end held or anchored to the pivot pin 76 while the other end is fixed to the arm 84 of lever 80.

With the construction which is described, when the water leaks or drips from tank 10 it is caught by the basin 70, and when an appreciable amount of water has been thus caught, the weight of that water is such as to cause the basin 70 to swing down, as indicated by the arrow in Fig. 2, with consequent lifting or upward movement of the part 85 projecting from the arm 84. Such movement of part 85 causes turning of the lever 80 with consequent downward movement or pulling of the line 81 so that arm 57 is moved down. When sufficient movement of arm 57 has occurred, the finger 54 of the trip lever 50 is released and the valve element 34 of valve D is released so that it is closed by spring 42.

In practice it is preferred to provide a check valve 95 in the delivery line 24, which valve serves to normally freely pass flow of water from the heater but serves to positively check or prevent return of water to the heater. With the check valve present in line 24 and with the valve D in the delivery or supply line 22, when a leak occurs in the heater, for instance, in the tank 10, the escaping water is caught by the basin 20 and, through means E and C, trips the valve E. Under such circumstances flow of water is checked to the heater either from line 24 or from line 22, and in the case of the ordinary leak no air will enter the tank so there can be no escape from the heater therefrom. Under the most adverse circumstances the escape of water cannot exceed the amount of water contained in the tank at the time that the valve D is tripped or operated.

Having described only a typical preferred form and application of my invention, I do not wish to be limited or restricted to the details herein set forth, but wish to reserve to myself any variations or modifications that may appear to those skilled in the art and fall within the scope of the following claims.

Having described my invention, I claim:

1. A control for a water heater having a tank and a water supply line connected to the tank including, a valve in the supply line and including means normally releasably holding the valve open, a gravity actuated means below the tank responsive to water leaking from the tank, and including a catch basin coextensive with the bottom of the tank and adapted to receive water leaking from the tank, and a coupling between the last mentioned means and the valve whereby the valve is released to close when the said last mentioned means acts in response to water leaking from the tank.

2. A control for a water heater having a tank and a water supply line connected to the tank including, a valve in the supply line and including means normally releasably holding the valve open, a gravity actuated means below the tank responsive to water leaking from the tank, and including a catch basin coextensive with the bottom of the tank and adapted to receive water leaking from the tank, and means pivotally supporting the basin, and a coupling between the last mentioned means and the valve whereby the valve is released to close when the said last mentioned means acts in response to water from the tank.

3. A control for a water heater having a tank and a water supply line connected to the tank including, a valve in the supply line and including a spring normally tending to close the valve and a means normally releasably holding the valve open, a gravity actuated means below the tank responsive to water leaking from the tank, and including a catch basin coextensive with the bottom of the tank and adapted to receive water leaking from the tank, and means pivotally supporting the basin, and a coupling between the last mentioned means and the valve whereby the valve is released to close when the said last mentioned means acts in response to water from the tank.

4. A control for a water heater having a tank and a water supply line connected to the tank including, a valve in the supply line and including means normally releasably holding the valve open, a means below the tank responsive to water leaking from the tank and including a catch basin coextensive with the bottom of the tank, and a coupling between the last mentioned means and the valve whereby the valve is released to close when the said last mentioned means acts in response to water from the tank, the coupling including, a pivoted lever cooperatively related to the last mentioned means and a member connecting the lever and the first mentioned means.

5. A control for a water heater having a tank and a water supply line connected to the tank including, a valve in the supply line and having a body with a passage therethrough, a valve element in the body controlling the passage and having a stem project therefrom, a trip lever mounted on the body and controlling the stem, and a control lever mounted on the body and releasably latched to the trip lever, a means below the tank responsive to water leaking from the tank and including a catch basin coextensive with the bottom of the tank, and a coupling between the last mentioned means and the valve whereby the valve is released to close when the said last mentioned means acts in response to water from the tank, the coupling including a lever operated by said means and a member connecting the last mentioned lever and the control lever.

6. A control for a water heater having a tank and a water supply line connected to the tank including, a valve in the supply line and having a body with a passage therethrough, a valve element in the body controlling the passage and having a stem project therefrom, a spring normally yieldingly urging the valve element to a closed position, a trip lever mounted on the body and normally holding the stem in position where the valve element is in an open position, and a control lever mounted on the body and releasably latched to the trip lever, a means below the tank responsive to water leaking from the tank and including a catch basin coextensive with the bottom of the tank, and a coupling between the last mentioned means and the valve whereby the valve is released to close when the said last mentioned means acts in response to water from the tank, the coupling including a lever operated by said means and a member connecting the last mentioned lever and the control lever.

7. A control for a water heater having a tank and a water supply line connected to the tank including, a valve in the supply line and including means normally releasably holding the valve open, a means below the tank responsive to water leaking from the tank and including a catch basin coextensive with the bottom of the tank, and a coupling between the last mentioned means and the valve whereby the valve is released to close when the said last mentioned means acts in response to water from the tank, said last mentioned means including an upwardly opening catch basin beneath the tank and a mounting pivotally supporting the basin adjacent its periphery.

8. In combination, a heater tank, a water supply line connected to the tank, a water delivery line connected to the tank, a check valve related to the delivery line checking flow of water to the tank from the delivery line, a normally open control valve in the supply line, means below the tank responsive to water escaping from the tank and including a catch basin coextensive with the bottom of the tank, and a coupling from said means to the control valve whereby the control valve closes when a predetermined amount of water has escaped from the tank.

9. In combination, a heater tank, a water supply line connected to the tank, a water delivery line connected to the tank, a check valve related to the delivery line checking flow of water to the tank from the delivery line, a normally open control valve in the supply line, means below the tank responsive to water escaping from the tank, and a coupling from said means to the control valve whereby the control valve closes when a predetermined amount of water has escaped from the tank, the said means including a pivotally mounted upwardly opening catch basin coextensive with and below the tank.

10. In combination, a heater tank, a water supply line connected to the tank, a water delivery line connected to the tank, a check valve, related to the delivery line checking flow of water to the tank from the delivery line, a normally open control valve in the supply line, means below the tank responsive to the water escaping from the tank and including a catch basin coextensive with the bottom of the tank, and a coupling from said means to the control valve whereby the control valve closes when a predetermined amount of water has escaped from the tank, the coupling being a mechanical connection operated by said means and extending therefrom to the control valve and being operatively connected thereto.

11. In combination, a heater tank, a water supply line connected to the tank, a water delivery line connected to the tank, a check valve related to the delivery line checking flow of water to the tank from the delivery line, a normally open control valve in the supply line, means below the tank responsive to water escaping from the tank, and a coupling from said means to the control valve whereby the control valve closes when a predetermined amount of water has escaped from the tank, the said means including a pivotally mounted upwardly opening catch basin coextensive with and below the tank, and the coupling being a mechanical connection operated by said means and extending therefrom to the control valve and being operatively connected thereto.

References Cited in the file of this patent
UNITED STATES PATENTS

| | | |
|---|---|---|
| 1,237,937 | Melin | Aug. 21, 1917 |
| 1,651,034 | McIntosh | Nov. 29, 1927 |
| 2,520,820 | Williams | Aug. 29, 1950 |